Aug. 26, 1941.  B. H. PARKER  2,253,980
DOUBLE POINTER TELEMETER INDICATOR
Filed July 29, 1939
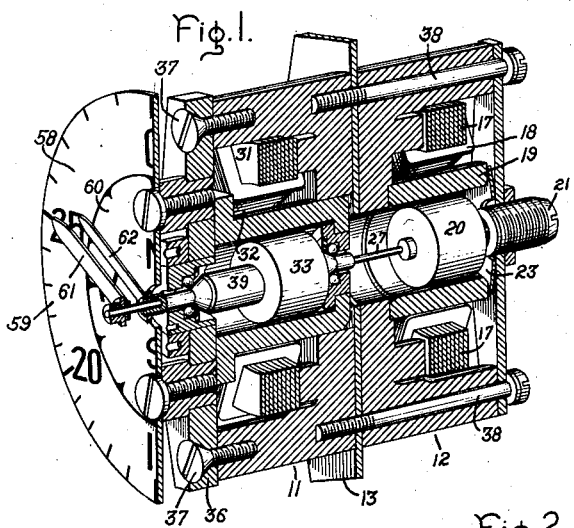
Inventor:
Benjamin H. Parker,
by Harry E. Dunham
His Attorney.

Patented Aug. 26, 1941

2,253,980

UNITED STATES PATENT OFFICE 2,253,980

DOUBLE POINTER TELEMETER INDICATOR

Benjamin H. Parker, Lynn, Mass., assignor to General Electric Company, a corporation of New York Application July 29, 1939, Serial No. 287,350

4 Claims. (Cl. 177—327)

My invention relates to indicating instruments and mounting arrangements therefor.

It is an object of my invention to provide an improved, compact, sturdy multi-unit instrument assembly and low friction movable element mounting arrangement in which separate pointers may cooperate with a common scale, in which the parts may be readily disassembled for inspection and repair with a minimum of manual operations and without interference with electrical connections or danger of disturbance of mechanical adjustments.

Other and further objects and advantages will become apparent as the description proceeds.

In carrying out my invention in its preferred form I provide a pair of coaxial indicating instrument units mounted base to base or one above the other with the shaft of one unit extending through a hollow rotor and a hollow shaft of the other unit, and having pointers mounted at the ends of the through shaft and the hollow shaft, respectively. The hollow rotor unit is provided with cone type ball bearings and the other unit is provided with jewel bearings, one of which is at the far end of the unit, and the other of which is supported within or by the hollow shaft of the hollow rotor unit. The two units are removably secured together, and the mounting arrangement for the hollow shaft unit is such that the movable elements of both units may be removed as a unit for the purpose of inspection by unfastening and lifting the scale plate and cover of the instrument.

The invention will be understood more readily from the following detailed description when considered in connection with the accompanying drawing, and those features of the invention which are believed to be novel and patentable will be pointed out in the claims appended hereto. In the drawing Figure 1 is a perspective view of one embodiment of my invention having a portion thereof removed to expose the movable portion of the apparatus and show a longitudinal vertical section of the stationary portion of the apparatus. Figure 2 is a longitudinal vertical section of the entire apparatus of Figure 1. Like reference characters are utilized throughout the drawing to designate like parts.

Although my invention is applicable to use with multi-unit indicating and deflecting instruments of numerous different types, for the sake of illustration I have shown in the drawing an embodiment of my invention forming a double unit, double pointer indicator or receiver for a direct-current type of telemetric indicating system. The instrument illustrated consists of a pair of units 11 and 12 mounted one against the other on a partition strip or wall 13 secured in an instrument casing, not shown. The units 11 and 12 may, of course, be mounted one in front of the other with a common horizontal axis or one above the other with a common vertical axis, or, if desired, may have an inclined axis, but for convenience I shall refer to the unit 11 as the upper unit and the unit 12 as the lower unit, the terms "upper" and "lower," and "above" and "below" being used in the description and claims to designate merely the relative positons of parts and being intended to include equivalent relative positions regardless of the actual direction of the axis of the instrument.

The lower unit 12 comprises a supporting frame 14 (Fig. 2) including a substantially circular base 15, above, with posts 16 extending downwardly. A stationary field member may be secured to the frame 14, consisting of a laminated ring core 17 carrying a plurality of current-conducting coils 18, a damping cylinder 19, coaxial with the base 15 and the field core 17, secured to the base 15 within the field core 17 and a magnetic rotor 20 rotatably mounted coaxially with the remainder of the instrument, within the damping cup 19 in inductive relation to the field core 17. The lower unit 12 is provided with a lower bearing consisting of a jewel screw 21 screwed into a central opening in a plate 22 fastened to the posts 16. To assist in securing the damping cylinder 19 to the base 15 a dished spring washer 23 may be provided between the top surface of the plate 22 and the lower end of the cylinder 19.

The lower bearing is of the jewel type consisting of a ring jewel 24 and a flat disk jewel 25 mounted in a suitable cavity in the upper end of the jewel screw 21. As will be well understood by those skilled in the art, the ring jewel 24 consists of a disk of a suitable natural or artificial semi-precious stone, such as sapphire, with a hole bored therein to serve as a side thrust bearing. Preferably, the central hole is counterbored to provide a minimum of friction surface in the side thrust bearing. The end thrust bearing or step bearing consists merely of a top surface of the jewel 25 which may be of the same composition as the jewel 24 and against which the lower tip 26 of the rotor shaft 27 is permitted to rest. It will be understood that the tip 26 is preferably rounded to form a spherical pivot. As will be explained hereinafter the unit 12 is provided also with an upper bearing, mounted within the shaft of the upper unit, which has a hollow shaft. The shaft 27 for the lower unit, to which the rotor 20 is connected, extends upward through and beyond the upper unit and its hollow shaft.

The upper unit 11 is also provided with a supporting frame 28 having a base 29 below and upwardly extending posts 30, a laminated ring core 31 carrying current-conducting coils 32, and a magnetic rotor 33, all similar to the corresponding parts of the lower unit 12. The upper unit is provided likewise with a damping cylinder, but which however is changed slightly in shape to take the form of a damping cup 34 with an upper flange 35. To support the damping cup 34 at its flange 35 a top plate 36 is provided which, in turn, is supported by the upwardly extending posts 30 to which it is fastened by means of screws 37. Through bolts 38 may be provided extending through the posts 16 of the lower unit 12 into the base 29 of the upper unit 11 for the purpose of securing the supporting frames of both units to the supporting wall 13 and securing the lower plate 22 to the posts 16.

The upper unit 11 is provided with a hollow shaft for supporting its hollow rotor 33 in order that the shaft 27 of the lower unit may project at the upper end of the instrument. The hollow shaft 39 for the upper unit is composite being in the form of a number of parts assembled together and has stub shafts 40 and 41 at the upper and lower ends, respectively, with conical portions 42 and 43. Cooperating with the conical portions 42 and 43 to form cone bearings for the upper unit, two ball bearings 44 and 45 are provided, one of which includes a ball race secured in the top plate 36, and the other of which includes the ball race secured in the bottom of the damping cup 34.

The hollow shaft 39 consists also of a hollow spindle 46 having an upper portion 47 of greater diameter than the central opening in the rotor 33, and having a lower portion 48 of such a diameter as to fit closely within the central opening in the rotor 33 and extend downwardly beyond it. The lower stub shaft 41 includes an upper portion 49 with an internal bore of such diameter as to receive and fit closely the lower projecting end 48 of the hollow spindle 46. The lower portion 50 of the stub shaft 49 is of decreased diameter and extends through the ball bearing 45 with the conical portion 41 resting against the ball bearing so that both side thrust and end thrust are taken up. For securing the upper stub shaft 40 to the hollow spindle 46 a coupling sleeve 51 is provided which has an inner bore of such diameter as to receive and fit closely the portion 47 of the hollow spindle 46 and a larger diameter portion 52 of the stub shaft 40. The stub shaft 40 is also provided with a smaller-external-diameter portion 53 at the upper end which extends through the ball bearing 44.

To provide an upper bearing for the through shaft 27 of the lower unit 12 a ring jewel 55 is set in the connecting coupling 51 between the members 52 and 47, and a collar 56 is secured to the shaft 27 just below the ring jewel 55. The ring jewel 55 may be similar in shape and composition to the ring jewel 24 of the lower jewel bearing and the inner surface of said bore serves as a side thrust bearing, whereas the lower surface together with the collar 56 serves as an end thrust bearing for the rotor of the lower unit. It will be understood that the collar 56 is sufficiently small in outer diameter to leave clearance space 57 within the hollow spindle 46.

A scale plate 58 is secured in any suitable manner to the top plate 36 of the instrument and is marked with suitable concentric scales for the two units, in this case, the outer scale 59 with numerical markings and the inner scale 60 with suitable markings to indicate the points of the compass. To cooperate with the scales 59 and 60, pointers 61 and 62 are provided. The pointer 61 controlled by the lower unit is mounted at the upper end of the shaft 27, and the pointer 62 controlled by the upper unit is mounted at the upper end of the hollow shaft 39 on the reduced diameter portion 53 of the upper stub shaft 40.

The mounting and assembling arrangement is not limited to telemetric receivers or indicators but is equally applicable to current-responsive measuring instruments, for example, permanent magnet instruments of the type described in United States Patent 2,102,409 to Faus. The telemetric indicator instruments shown, which do not in themselves constitute a part of my invention, may be of the type shown, for example, in the copending applications of Harold T. Faus, Serial No. 253,368, filed January 28, 1939 and Serial No. 238,851, filed November 4, 1938, Patent No. 2,181,803, granted November 28, 1939, and assigned to the same assignee as the present application. The rotors 20 and 33 are transversely magnetized permanent magnets composed of a mixture such as powdered magnetite, ferric oxide and cobaltic oxide in the proportions of 43.6 parts magnetite, 30.1 parts ferric oxide, and 26.3 parts cobaltic oxide, molded in shape under pressure of from three to five tons per square inch, subjected to heat treatment and magnetized while hot, as described more in detail in the foregoing applications. The damping cylinders 19 and 34 are composed of any suitable current conducting material, such as copper or aluminum, for example. The laminated field cores 17 and 31 are preferably composed of relatively permeable low-hysteresis material, such as a nickel-iron alloy containing approximately 78½% nickel. The current conducting coils 18 and 32 are spaced around the periphery of the field cores 17 and 31, the arrangement shown having angular spacings of 120 degrees. The connections and the arrangement of the telemeter transmitter, not shown, are such as to produce opposing currents in the coils 18 and 32 which set up magnetic fluxes in the cores 17 and 31 which flow in opposite directions in a semi-circle on either side of a given diameter and cause a cross flux to flow diametrically across the field member and through the rotor so as to bring the rotor to a position with its poles in line with the diametric flux. As explained more in detail in the foregoing applications, the telemeter arrangement is such as to vary the current distribution in the stator coils and cause the angular direction of the diametric fluxes to vary in correspondence with the variations in indications to be transmitted, thus causing rotation of the rotors 20 and 33 and the pointers 61 and 62. These features, however, need not be described in detail since they are not my invention.

It will be apparent that the movable element of the lower unit is provided with a very low friction rotatable support by virtue of the jewel bearings which have hard smooth surfaces, and in view of the extreme lightness of the rotatable element, consisting only of the pointer 61, the shaft 27 and the rotor 20, which is very light by virtue of its composition. Similarly the rotatable element of the upper unit 11, while carrying slightly more weight, is provided with an extremely low friction rotatable mounting by virtue of the use of ball bearings.

In certain applications, such as instruments for airplanes, for which direct current telemetering systems are particularly suitable, it is desirable and legally required that the instruments be disassembled at periodic intervals for inspection of the bearings. This operation can be performed very readily in my construction. The removal of the movable elements on their mountings may be accomplished very quickly by loosening the two screws 37 and lifting the top plate 36 away from the stationary elements. The upper damping cup 35, being secured to the top plate 36, is removed as a unit with the plate 36 and carries the entire rotatable structure since the hollow shaft of the upper unit is supported within the cup 34, and the shaft 27 of the lower unit and the rotor 20 are supported within the hollow shaft of the upper unit. This operation does not necessitate removal of the field cores 17 and 31 or the field coils 18 and 32, so that it becomes unnecessary to interfere with the electrical connections of the apparatus. Likewise, it is unnecessary to disturb the mechanical adjustments of the jewel screw, ball bearings, or any other part of the apparatus. If further disassembly and inspection is desired, this could also be readily accomplished merely by pushing the pointers off the ends of their shafts, loosening the screws, not shown, securing the flange 35 to the plate 36, and dropping the cup 34, for examination of the ball bearings 44 and 45. It will be apparent also that, in the original process of manufacture, the assembly of the parts can be carried out readily since the various groups of parts are self-supported as units of increasing size as the process of construction proceeds.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A mounting arrangement for a pair of independently rotatable elements comprising a pair of fixed bearings and cone-shaped end and side thrust journals cooperating therewith at the ends of one of said elements, a fixed bearing in axial alignment with said previously mentioned bearings and a bearing mounted within said first mentioned movable element also in axial alignment with the previously mentioned bearings, and journals carried by the second of said movable elements cooperating with said last mentioned two bearings.

2. A double unit shaft mounting arrangement comprising a hollow shaft including a hollow spindle, a rotatable element carried by the hollow shaft, stub shafts formed to receive the projecting ends of said hollow spindle having end portions of reduced diameter and intermediate portions of tapering diameter, said hollow shaft having mounted therewithin a ring jewel to serve as a bearing for a shaft extending through the hollow shaft and having ball bearings cooperating with the stub-shaft ends of the hollow shaft to form cone bearings.

3. In a double unit indicating instrument, a pair of coaxial rotors, one of which is hollow, a shaft on which the other rotor is mounted, said shaft extending through the first mentioned rotor, a jewel bearing for one of said rotors adjacent the end thereof receiving the end of its shaft, ball bearings for the other of said rotors, a hollow shaft for said rotor extending therethrough provided with conical portions at the ends thereof and portions of diminished diameter beyond the conical portions, said portions of diminished diameter extending through said ball bearings whereby cone-type ball bearings are formed to take up both side thrust and end thrust, said hollow shaft having mounted therewithin a ring jewel with an internal bore of such diameter as to form a side thrust bearing for the through shaft of the first mentioned rotor, said through shaft having a collar secured thereto adjacent said ring jewel to form an end thrust bearing, the shaft of the first rotor extending beyond the end of the hollow shaft, and each of said shafts having a pointer mounted at the end thereof.

4. A double unit indicating instrument comprising a pair of coaxial units mounted one above the other having separate pointers cooperating with a common scale plate, the lower unit comprising a supporting frame including a base above a stationary field member, a damping cylinder, a magnetic rotor, a lower bearing including a ring jewel and a step bearing jewel, a through shaft to which said rotor is secured, the lower end of which cooperates with said lower bearing, said upper unit comprising a stationary frame including a base below removably secured to the base of the lower unit, a stationary field member, a damping cup, a magnetic rotor, upper and lower ball bearings, a composite hollow shaft for rotatably supporting the rotor of the upper unit, said hollow shaft comprising a hollow spindle with an upper portion of greater external diameter than the lower portion, and with a lower portion of greater axial length than the rotor of the upper unit closely fitting therein to support the rotor, a lower hollow stub shaft having such an inner diameter as to fit closely over the lower projecting end of said hollow spindle for supporting it, the external diameter of the upper portion of the stub shaft being greater than the external diameter of the lower portion of the stub shaft, and the intermediate portion having a conical outer surface to form with said lower ball bearing a combination end and side thrust bearing, a coupling sleeve having a lower portion closely fitting around the upper end of said hollow spindle and an upper hollow stub shaft having a lower portion of greater external diameter than the upper portion, and having an intermediate portion of conical external surface, the said lower portion closely fitting into the upper portion of said coupling sleeve, the portion of least external diameter extending upwardly from the said upper ball bearing with the conical surface in cooperation with said upper ball bearing whereby a combination end and side thrust bearing is formed, a ring jewel being mounted coaxially within said coupling sleeve between the upper end of said hollow spindle and the lower end of said upper stub shaft whereby a side thrust bearing is formed for the through shaft of said lower unit, said through shaft extending upwardly beyond the end of said upper hollow stub shaft, said through shaft having the collar secured thereto below said last mentioned ring jewel to form an end thrust bearing, the pointer for said upper unit being secured to the upper end of said upper hollow stub shaft and the pointer of said lower unit being secured to the end of the through shaft of the lower unit.

BENJAMIN H. PARKER.